(12) United States Patent
Wiley

(10) Patent No.: US 10,439,194 B1
(45) Date of Patent: Oct. 8, 2019

(54) BATTERY TERMINAL ADAPTER

(71) Applicant: Lawrence Brian Wiley, Stuart, FL (US)

(72) Inventor: Lawrence Brian Wiley, Stuart, FL (US)

( * ) Notice: Subject to any disclaimer, the term of this patent is extended or adjusted under 35 U.S.C. 154(b) by 378 days.

(21) Appl. No.: 15/075,651

(22) Filed: Mar. 21, 2016

Related U.S. Application Data

(63) Continuation-in-part of application No. 14/681,240, filed on Apr. 8, 2015, now Pat. No. 10,115,955.

(60) Provisional application No. 61/977,143, filed on Apr. 9, 2014.

(51) Int. Cl.
| | |
|---|---|
| *H01M 2/30* | (2006.01) |
| *H01R 11/26* | (2006.01) |
| *H01R 9/24* | (2006.01) |
| *B60L 11/18* | (2006.01) |
| *H01M 2/20* | (2006.01) |

(52) U.S. Cl.
CPC ........... *H01M 2/30* (2013.01); *B60L 11/1851* (2013.01); *H01M 2/206* (2013.01); *H01R 9/2416* (2013.01); *H01R 11/26* (2013.01)

(58) Field of Classification Search
CPC ...... H01M 2/206; H01M 2/30; H01R 9/2416; B60L 11/1851

USPC ......................................................... 429/121
See application file for complete search history.

(56) References Cited

U.S. PATENT DOCUMENTS

| | | | |
|---|---|---|---|
| 2004/0166737 A1* | 8/2004 | Cheng | H01H 85/205 439/620.26 |
| 2005/0153202 A1* | 7/2005 | Ratte | H01M 2/30 429/178 |

* cited by examiner

*Primary Examiner* — Bryan D. Ripa
*Assistant Examiner* — James M Erwin
(74) *Attorney, Agent, or Firm* — John Rizvi; The Patent Professor®

(57) ABSTRACT

A battery terminal adapter providing support for a plurality of wires, allowing several wires to be connected simultaneously and in parallel to a single, threaded battery electrode or terminal, such as a positive or negative threaded electrode of a vehicle battery. For this purpose, the battery terminal adapter includes an adapter body having a threaded battery terminal receiving cavity, two or more wire-receiving holes and two or more fastener bores in spatial communication with a respective one of the wire-receiving holes. The wire-receiving holes are in electrical communication with the battery terminal receiving cavity so that all electrical wires connected to the wire-receiving holes are powered by the battery.

18 Claims, 13 Drawing Sheets

BATTERY TERMINAL ADAPTER

CROSS-REFERENCE TO RELATED APPLICATIONS

This application is a Continuation-In-Part and claims the benefit of co-pending U.S. Utility patent application Ser. No. 14/681,240, filed Apr. 8, 2015, which in turn claims the benefit of U.S. Provisional Patent Application Ser. No. 61/977,143, filed Apr. 9, 2014. The aforementioned patent applications are incorporated herein in their entirety.

FIELD OF THE INVENTION

The present invention relates generally to a battery terminal adapter, and in particular, to a battery terminal adapter that enhances the operational capacity of a battery by providing a mechanical and electrical interface for connecting several electrical cables to a single battery terminal.

BACKGROUND OF THE INVENTION

It is known in the art that a battery is a device for storing chemical energy and converting that chemical energy into electricity. The battery generally includes one or more electrochemical cells, each of which consists of two half-cells or electrodes. One half-cell, called the negative electrode, has an overabundance of the tiny, negatively charged subatomic particles called electrons. The other, called the positive electrode, has a deficit of electrons. When the two halves are connected by a wire or an electrical cable, electrons will flow from the negative electrode to the positive electrode.

Many kinds of batteries are known in the market, depending on multiple design factors such as the output voltage, the output current, the chemical components comprised in the battery, and other diverse factors. For instance, an automotive battery is a type of rechargeable battery that supplies about 12 volts of electrical energy to an automobile vehicle. Automotive batteries are made up of one or more electrochemical cells, each having the capacity to convert chemical energy into a more readily usable form of electrical energy. Automotive batteries are widely employed in many industries and vehicles, including starting, lighting, and ignition (SLI) batteries capable of starting the internal combustion engines of various vehicles, such as cars, trucks, motorcycles, and boats.

Generally, automotive batteries and other batteries are provided with external positive and negative terminals to which the automobile electrical system is connected in order to receive electrical power from the battery. Normally, battery terminals are prepared for coupling a single electrical wire or connector. Battery terminals generally take the form of threaded or unthreaded posts protruding outwardly from an outer surface of the battery. The electrical wire can be coupled to the battery terminal by threading, clipping, or looping an end of the wire or an end connector carried by the wire to the battery terminal.

The vehicle or electrical device feeding from the battery can include one or more electrical outlets to which additional electrical devices can connect ad through which the additional electrical devices can indirectly receive electrical power from the battery.

Conventional methods and devices for powering additional portable electrical devices into an automobile can overwhelm the terminal connections on a typical automobile battery. For example, there are physical limitations for a motorcycle, snowmobile, all-terrain vehicle, or off-road vehicle to plug in a cell phone. With a factory installed cigarette lighter socket, one appliance can be plugged in, but with multiple devices access to the battery may be restricted. Additionally, there are instances when a multiplicity of external electrical devices requires a connection to a same automotive battery. A conventional automotive battery terminal does not normally have the capacity to provide a direct electrical interface to more than one device or electrical system.

In addition, battery compartments (i.e., compartment on a boat, or hood compartment of a vehicle) often limit access and the ability to connect multiple electronic devices to a battery. Thus, one must often remove a battery from the compartment to an open space in order to manipulate the electrical connections to the battery terminals.

What is desired is a battery terminal adapter that forms an electrically conductive and mechanically robust connection between a battery terminal and more than one electrical cable, and that is convenient to manipulate in the event of the battery being installed in a reduced space.

SUMMARY OF THE INVENTION

The present invention overcomes the deficiencies of the known art and the problems that remain unsolved by providing a battery terminal adapter that forms connections between multiple electrical components and a single, threaded battery terminal or electrode, providing an independent and convenient connection for each electrical component wire so that the electrical connections can be manipulated with ease, not requiring removal of the battery from its installation compartment.

In a first implementation of the invention, the battery terminal adapter comprises an adapter body having two or more wire-receiving holes, wherein each wire-receiving hole ends in at least one opening on a side of the adapter body. The adapter body further includes two or more fastener bores, wherein each fastener bore is in spatial communication with a respective one of the two or more wire-receiving holes. In addition, each fastener bore ends in an opening on a side of the adapter body. The adapter body also includes a battery terminal receiving cavity configured to receive the threaded battery terminal. The battery terminal receiving cavity is in electrically-conductive connection with the two or more wire-receiving holes. In addition, the battery terminal adapter includes a battery terminal securing thread, configured to threadingly engage with the threaded battery terminal. For instance, the battery terminal securing thread can be arranged on an internal wall of the adapter body delimiting the battery terminal receiving cavity, and thus the battery terminal can be threaded directly into the battery terminal receiving cavity. In another example, the battery terminal securing thread can be provided on an internal wall of a bore of a nut. The nut can be attached to the battery terminal in order to secure the battery terminal adapter in place on the battery terminal.

In another aspect, the adapter body can be elongated in shape along a longitudinal direction, and the two or more wire-receiving holes can be arranged in a spaced-apart relationship and aligned along the longitudinal direction.

In another aspect, the battery terminal receiving cavity can extend into the adapter body from an opening on a longitudinal end side of the adapter body. The two or more wire-receiving holes and the two or more fastener bores can extend into the adapter body from one or more lateral sides of the adapter body.

In another aspect, the at least one wire-receiving hole of the two or more wire-receiving holes can be a through hole extending into the adapter body from a first opening on a first lateral side of the adapter body to a second opening on an opposed, second lateral side of the adapter body. The through hole can form a T-shaped cavity with a fastener bore. Optionally, the through hole can include a flat wall facing the fastener bore.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms such as "first" and "second," "top" and "bottom," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 1:
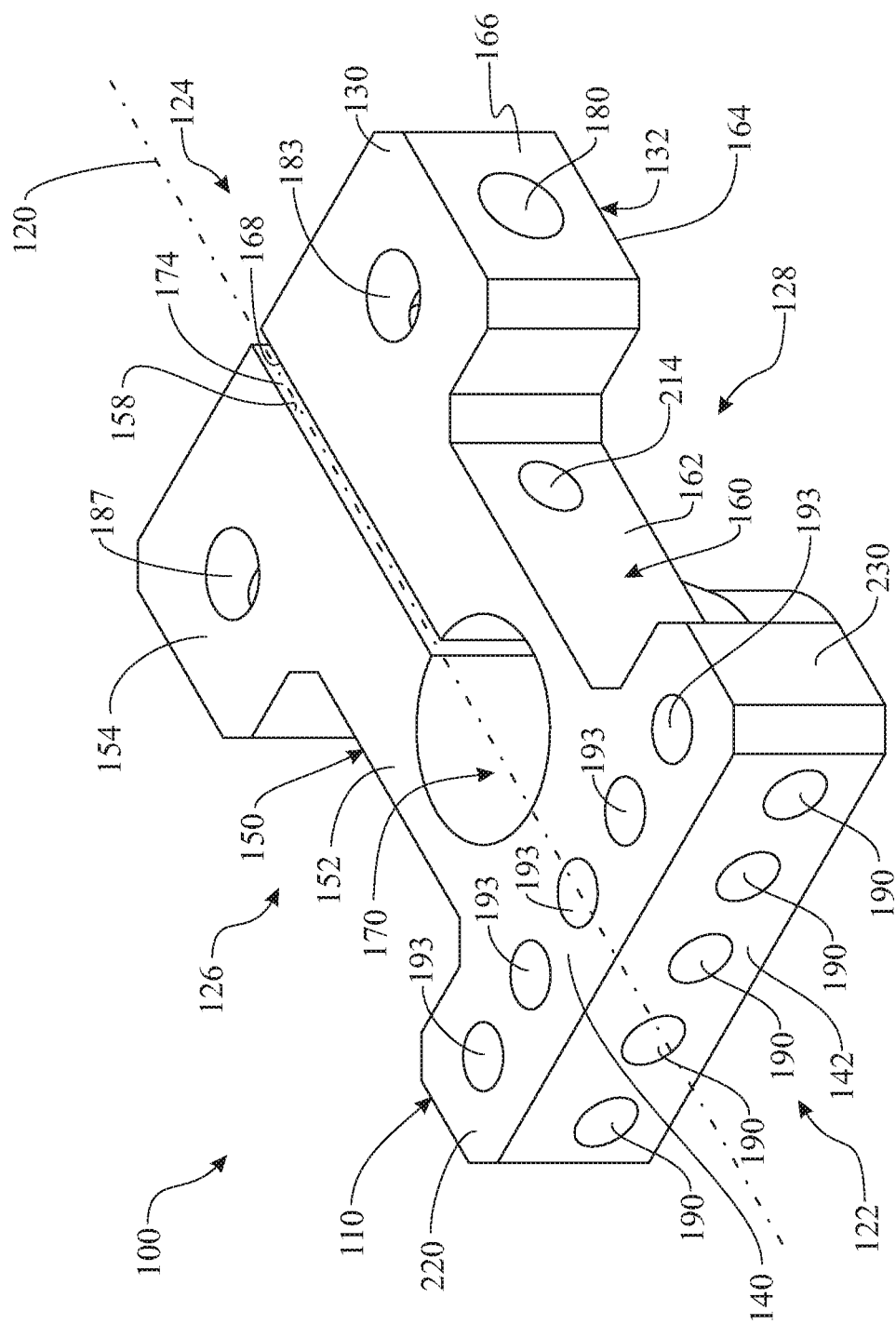
FIG. 1 presents an isometric view of a first exemplary embodiment of a battery terminal adapter in accordance with the invention.

The illustration of FIG. 1 shows an exemplary embodiment of a battery terminal adapter 100 in accordance with the invention. As will be explained, the battery terminal adapter 100 provides a conductive contact point that increases the number of electrical components that can connect to a power source battery. The battery may include, without limitation, a lead-acid battery, an SLI battery, and a photovoltaic cell battery. The battery terminal adapter 100 includes an adapter body 110 that attaches to a battery electrode or terminal, providing a framework for a plurality of conductive elements to electrically connect to the battery terminal. For this purpose, the body 110 includes strategically placed connection points and material compositions, as will be explained.

The adapter body 110 of the present embodiment is arranged generally along a longitudinal direction 120 and includes a longitudinal first end 122, an opposed longitudinal second end 124, a transverse first side 126 and an opposed transverse second side 128. In addition, the body 110 comprises a top surface 130 and a bottom surface 132. The body 110 further includes a side portion 140 from which two arms 150, 160 extend facing one another, generally along the longitudinal direction 120. Each arm 150, 160 comprises a central portion 152, 162 adjacent or contiguous to the side portion 140. In addition, each arm 150, 160 comprises an end portion 154, 164 arranged oppositely to the body side portion 140. A battery terminal receiving cavity 170 is delimited between the central portions 152, 162 of the arms 150, 160. The battery terminal receiving cavity 170 is shaped and sized to house a battery terminal or electrode, not shown in the figure. Arms 150, 160 are resiliently deformable in order for the size of the battery terminal receiving cavity 170 to be variable, so that the arms 150, 160 can fit tightly around a battery terminal that is inserted in the battery terminal receiving cavity 170. A longitudinal gap 174 extends from the battery terminal receiving cavity 170 and between the arms 150, 160.

In accordance with the invention, the adapter body 110 includes a plurality of wire-receiving holes for connecting multiple wires to a battery terminal that were inserted in the battery terminal receiving cavity 170. Specifically, the end portion of one or both arms comprises at least one wire-receiving hole in electrical communication with the battery terminal receiving cavity. For instance, in the present embodiment, the end portions 154, 164 of both arms 150, 160 comprise a respective wire-receiving hole 180, 184, said end portion wire-receiving holes 180, 184 being better shown in hidden (broken) lines in the top plan view of FIG. 2. In addition, the body 110 further comprises at least one wire-receiving hole arranged at the side portion 140. For instance, in the present embodiment, the body 110 comprises five wire-receiving holes 190. The battery terminal adapter 100 is configured so that all wire-receiving holes 180, 184, 190 are in electrical communication with the battery terminal receiving cavity 170.

Figure 2:
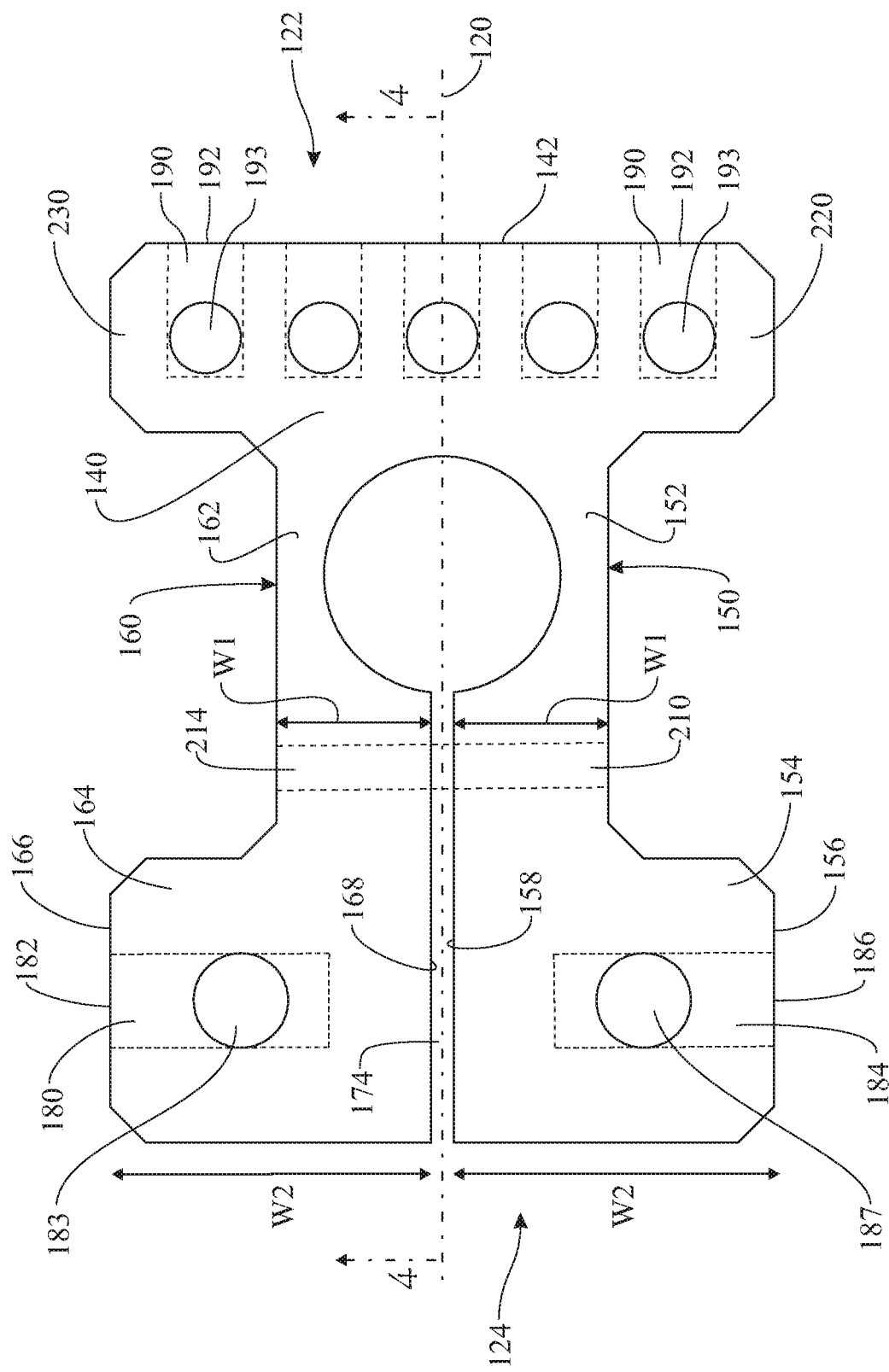
FIG. 2 presents a top plan view of the battery terminal adapter of FIG. 1.
Figure 3:
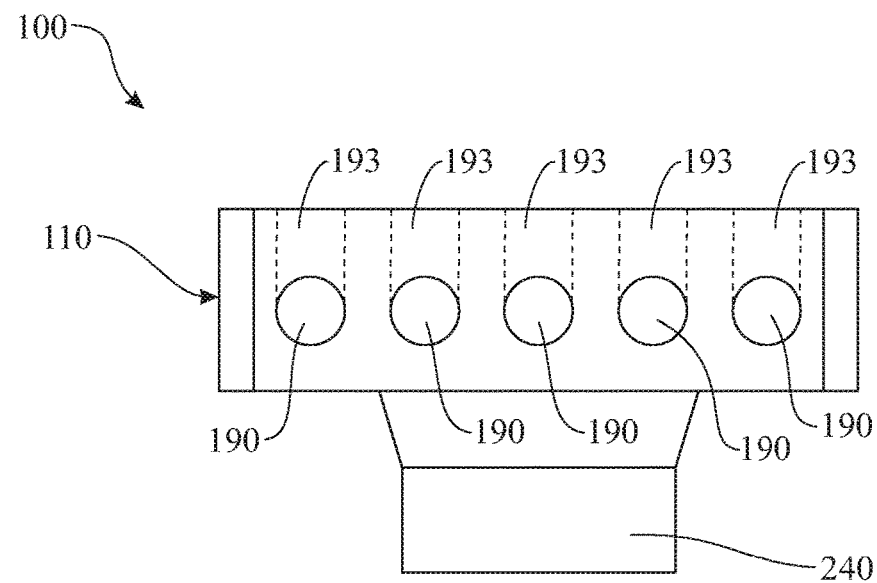
FIG. 3 presents a left side elevation view of the battery terminal adapter of FIG. 1.

In the present embodiment, the end portion 154, 164 of each arm 150, 160 is wider than the central portion 152, 162 of the arm, the arms 150, 160 thus being substantially L-shaped. The illustration of FIG. 2 shows the central portion width W1 being smaller than the end portion width W2. Having widened arm end portions 154, 164 provides greater volumetric dimensions for receiving higher cross-section wires. In other words, having the battery terminal adapter 100 provided with widened arm end portions 154, 164 allows the end portions 154, 164 to include wider wire-receiving holes 180, 184 and thus to receiver thicker electrical wiring.

As better shown in FIG. 2, the wire-receiving holes 180, 184 comprised in the arm end portions 154, 164 are arranged transversely, i.e., perpendicular to the longitudinal direction 120. The wire-receiving holes 180, 184 terminate in respective openings 182, 186 arranged on oppositely-facing respective side surfaces 156, 166 of the arm end portions. Having the openings 182, 186 arranged on oppositely-facing side surfaces 156, 166 prevents contact and possible tangling of the wires inserted through each respective opening 182, 186.

The adapter body 110 of the present embodiment includes an additional feature that allows to tightly and securely fasten the battery terminal adapter 100 onto a battery terminal. This additional feature consists in having the arm central portions 152, 162 comprise respective transverse through holes 210, 214, placed in alignment so that a fastener (not shown) can be inserted through both transverse through holes 210, 214. The fastener can be, for instance, a screw and a nut, or any other applicable fastener that allows exerting an inward force on the arms 150, 160 so they are resiliently deformed and brought together creating a tension, so that the arms 150, 160 tighten their grip of a battery terminal that is inserted in the battery terminal receiving cavity 170.

In the present embodiment, the side portion wire-receiving holes 190 are arranged on a terminal side surface 142 of the side portion 140, said terminal side surface 142 being arranged opposite to the battery terminal receiving cavity 170. The wire-receiving holes 190 end in respective openings 192 in the terminal side surface 142, while the wire-receiving holes 190 extend into the body 110 in the longitudinal direction 120. Having the openings 192 arranged on the terminal side surface 142 allows maximizing the separation between the wire-receiving holes 190 and the wire-receiving holes 180, 184 on the opposite end of the body 110, thus reducing the risk of wires tangling or short-circuiting in the vent of operating on the wires.

Preferably, as shown in FIGS. 1 and 2, the battery terminal adapter 100 further includes a fastener bore 183, 187, 193 corresponding to each wire-receiving hole 180, 184, 190. The fastener bores 183, 187, 193 are arranged perpendicular to the corresponding wire-receiving holes 180, 184, 190 and are physically communicated with the wire-receiving hole so that a fastener inserted into a fastener bore, such as a screw, can contact and exert a pressure on a wire in turn inserted in the corresponding wire-receiving hole. Such an arrangement allows securing wires inside the wire-receiving holes.

The wire-receiving holes 180, 184, 190 of the present embodiment are cylindrical bores. Alternative shapes are contemplated, such as the wire-receiving holes 180, 184, 190 having a D-shaped cross section, i.e., the holes having internal cylindrical walls truncated by a flat longitudinal wall. The flat longitudinal wall will generally face the fastener bores 183, 187, 193 to allow for the fasteners inserted in the fastener bores 183, 187, 193 to set flat on the electrical wires that are inserted in the wire-receiving holes 180, 184, 190, an thus enhance gripping of the wire by the fasteners.

In order to maximize the number of wire-receiving holes, the side portion 140 of the preferably comprises opposite transversely protruding end portions 220, 230, providing additional volumetric space for placing additional wire-receiving holes. For instance, in the present embodiment, protruding end portion 220 and protruding end portion 230 comprise one respective wire-receiving hole 190.

As has been mentioned, all wire-receiving holes are electrically communicated with the battery terminal receiving cavity 170, so that electrical current can flow between the battery terminal receiving cavity 170 and each wire-receiving hole. Various embodiments are contemplated for providing electrical communication. For example, the battery terminal adapter 100 can be entirely metallic and electrically conductive. In another example, the battery terminal adapter 100 is only partially metallic, so that metallic parts provide a conductive connection between the battery terminal receiving cavity and all wire-receiving holes; the rest of the battery terminal adapter 100 can be made, for instance, of plastic so that the battery terminal adapter 100 outer surface is electrically isolated and there is no risk of electric discharge for a person touching the battery terminal adapter 100 when connected to a charged battery. Applicable metallic materials include, without limitation, a creep resistant copper alloy, bronze, brass, or copper-nickel.

Figure 4:
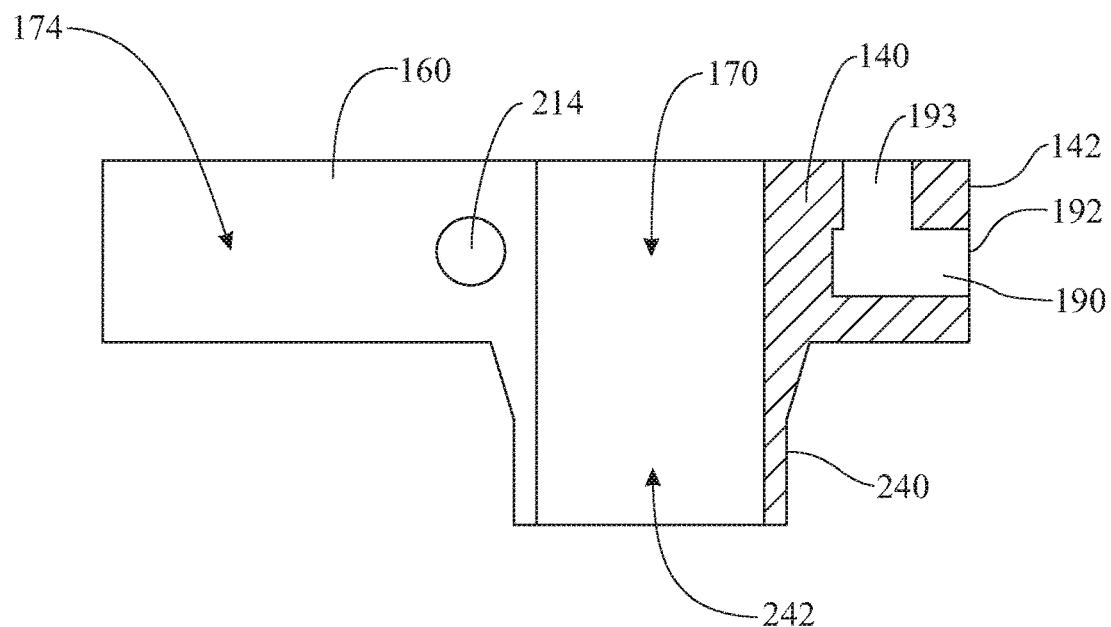
FIG. 4 presents a cross-sectional side elevation view of the battery terminal adapter of FIG. 1, according to cross-sectional plane 4-4 indicated in FIG. 2.

The adapter body 110 can optionally include a protruding neck portion 240. This protruding neck portion 240, as better shown in FIG. 4, provides an internal space 242 in continuation of the battery terminal receiving cavity 170, for incrementing the effective length of the battery terminal receiving cavity 170. Such an arrangement provides a mechanically robust connection to the battery terminal and further separation between the battery and the wires connected to the battery terminal adapter 100. The protruding neck portion 240 is a continuation of the side portion 140 and arms 150, 160, and is thus also resiliently deformable.

As has been explained, the end portion 154, 164 of each arm 150, 160 comprises a single wire-receiving hole 184, 180, and the body side portion 140 comprises one or more wire-receiving holes-in this embodiment, five wire-receiving holes-. Preferably, as shown, the wire-receiving holes 184, 180 arranged at the end portion 154, 164 of the arms 150, 160 have a greater cross-section than the wire-receiving hole or holes 190 comprised in the body side portion 140. Thus the wire-receiving holes 184, 180 can be used for connecting electrical cables capable of conducting higher electrical currents, for higher power consuming apparatus or systems such as a vehicle electrical system, whereas the opposite wire-receiving holes 190 can be used for connecting thinner cables for lower-power-consuming apparatus or systems, such as accessory electrical equipment installed in the vehicle (e.g., a fan).

Figure 5:
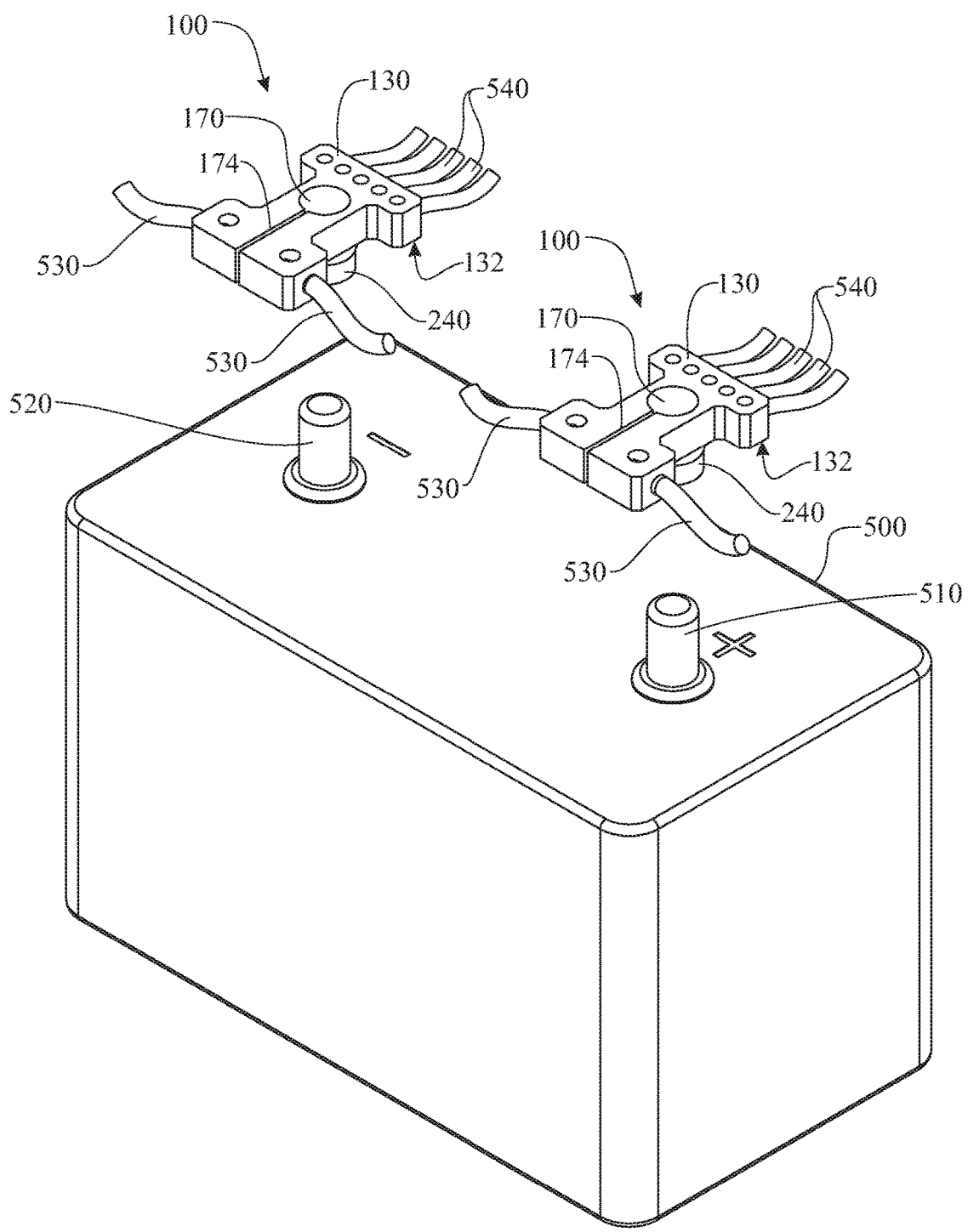
FIG. 5 presents an isometric front view of two battery terminal adapters of the type presented in FIG. 1, into which with a pair of primary cables and a plurality of secondary cables have been inserted, the battery terminal adapters shown about to be assembled onto two respective battery terminals of an exemplary vehicle battery.
Figure 6:
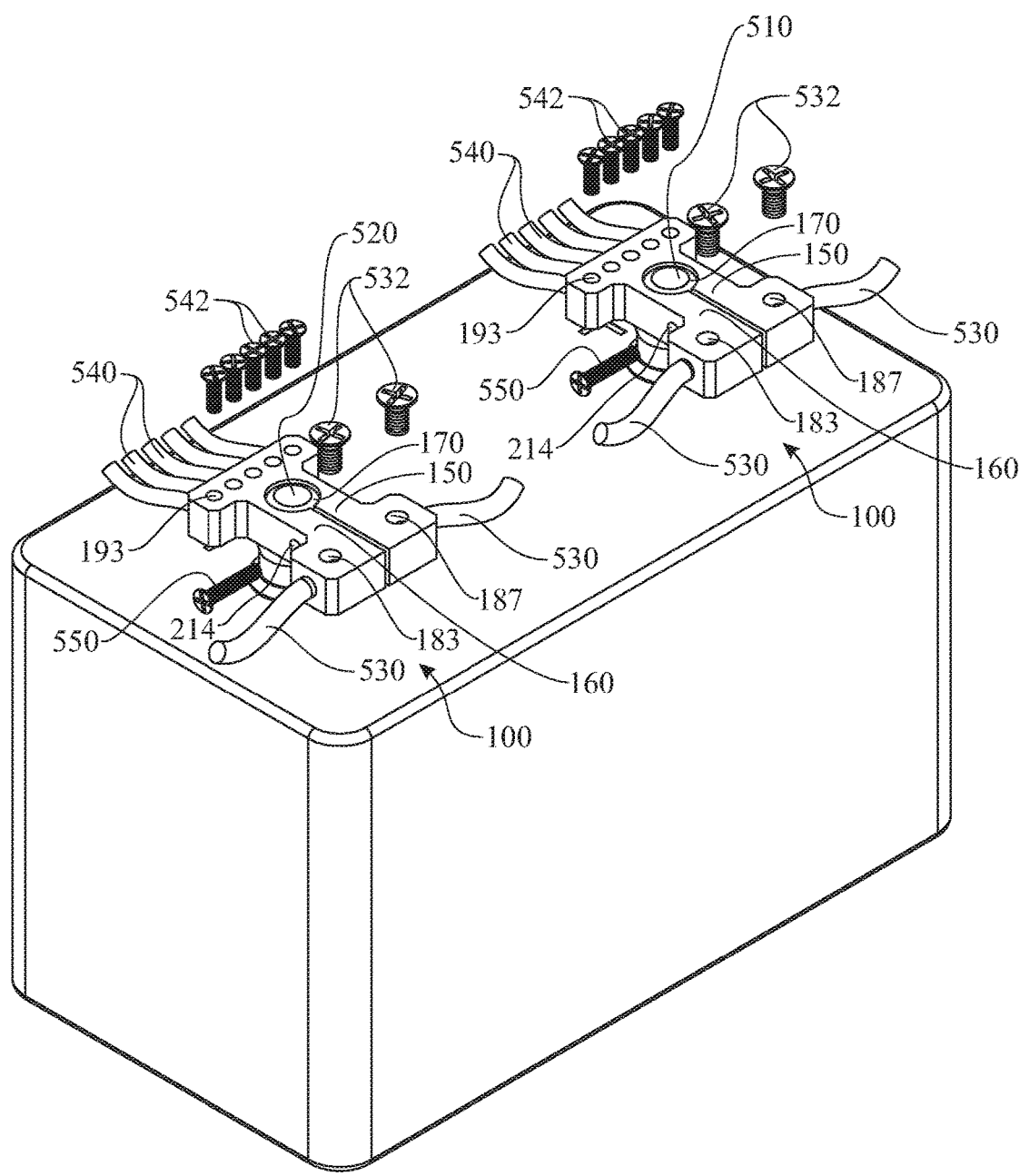
FIG. 6 presents an isometric front view of the battery terminal adapters of FIG. 5 partially assembled to the battery terminals.
Figure 7:
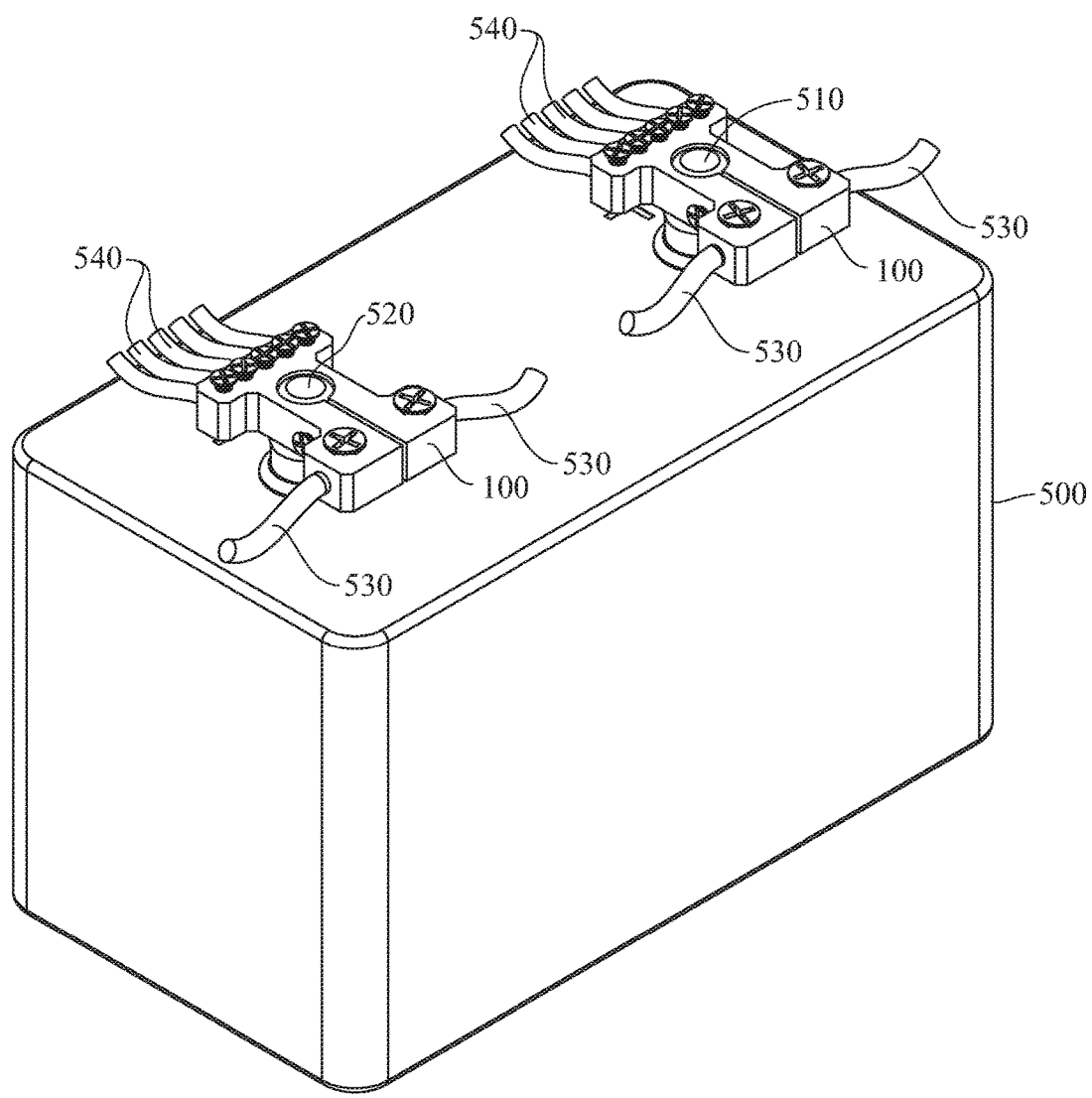
FIG. 7 presents an isometric front view of the battery terminal adapters of FIG. 5 fully assembled to the battery terminals.

The illustrations of FIGS. 5 through 7 teach an exemplary sequence of steps for assembling the battery terminal adapter 100 to an exemplary vehicle battery 500 provided with a positive terminal 510 and a negative terminal 520. More specifically, the figures show the steps to be followed for mounting one battery terminal adapter 100 to each battery terminal 510, 520. As shown in FIG. 5, thicker primary cables 530 and thinner secondary cables 540 have been inserted into the wire-receiving holes of each battery terminal adapter 100. The battery terminal adapters 100 have then been placed over the battery terminals 510, 520, so that the body bottom surfaces 132 and the protruding neck portions 240 face the battery 500, and so that the battery terminal receiving cavities 170 are aligned with the battery terminals 510, 520. Then, as depicted in FIG. 6, the battery terminal adapters 100 assembled onto the battery terminals 510, 520 so that the battery terminals 510, 520 are inserted and rest inside the battery terminal receiving cavities 170. Primary fasteners 532 and secondary fasteners 542 are inserted into the corresponding fastener bores 183, 187, 193, to secure the primary and secondary cables 530, 540 to the battery terminal adapters 100. In addition, transverse fasteners 550 are threaded into the transverse through holes 210, 214 to cause the arms 150, 160 to come together and tighten their grip around the battery terminals 510, 520. The final assembled state is illustrated in FIG. 7. As shown, the primary and secondary cables 530, 540 protrude outwardly from opposite ends of the battery terminal adapters 100, preventing undesired tangling of cables 530, 540 and maintaining cleanliness of the setup. In addition, separation of primary cables 530 from secondary cables 540 allows operation and manipulation of either type of cable without affecting the other, simplifying vehicle maintenance and repair, and installation and removal of electrical systems.

As shown in the figures, the battery terminal receiving cavity 170 of the present embodiment is cylindrical, and the longitudinal gap 174 is a narrow slot delimited by opposed parallel internal surfaces 158, 168 of the arms 150, 160. However, alternative embodiments are contemplated in which the shape of the battery terminal receiving cavity 170 and/or the longitudinal gap 174 may vary. For instance, alternative embodiments are contemplated in which the internal surfaces 158, 168 are arranged in a V-configuration, so that the end of the longitudinal gap 174 farthest to the battery terminal receiving cavity 170 is wider than the opposite end of the longitudinal gap 174. Such an arrangement enhances the ability of battery terminal adapter 100 to accommodate different size variations of battery terminals while maintaining the strength of the connection when tightening the battery terminal adapter 100 to the battery terminal.

Figure 8:
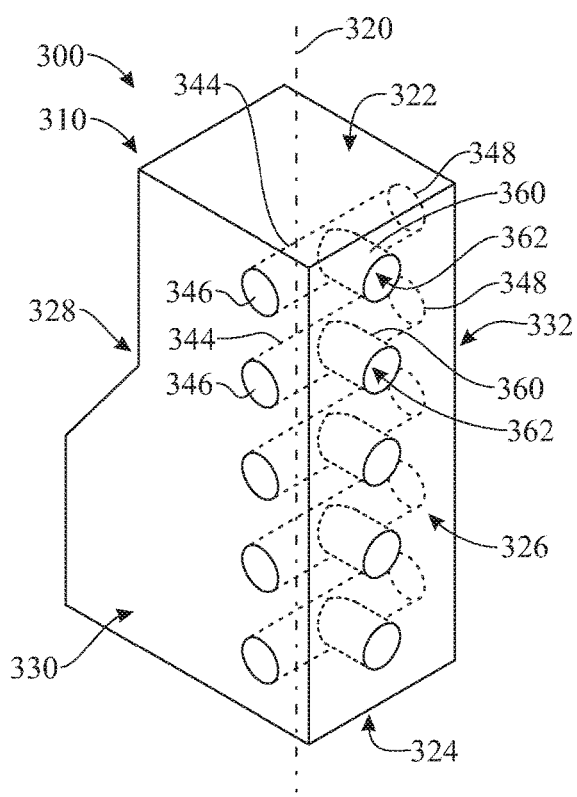
FIG. 8 presents a top isometric view of a battery terminal adapter in accordance with a second exemplary embodiment of the invention.
Figure 9:
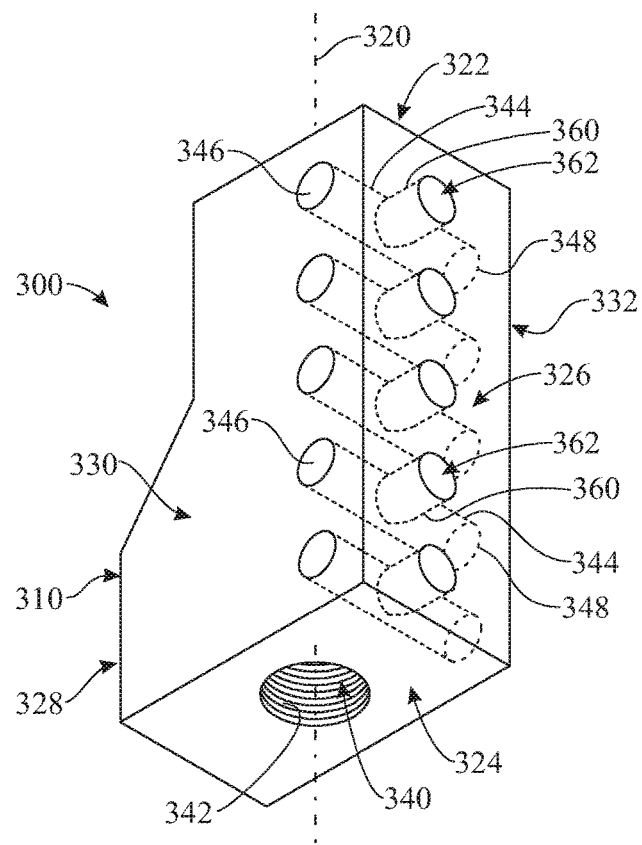
FIG. 9 presents a bottom isometric view of the battery terminal of the previous figure.

The illustrations of FIGS. 8 and 9 show a battery terminal adapter 300 in accordance with a second exemplary embodiment of the invention. Similarly to the previous embodiment, the battery terminal adapter 300 provides a conductive contact point that increases the number of electrical components that can connect to a power source battery. The battery terminal adapter 300 of the present embodiment includes an elongated or post-like adapter body 310. The elongated adapter body 310 is arranged generally along a longitudinal direction 320. In FIGS. 8 and 9, the longitudinal direction 320 is vertical in accordance with the orientation in which the adapter body 310 is illustrated.

The adapter body 310 includes a first longitudinal end side 322 and an opposed second longitudinal end side 324. According to the illustrated orientation of the battery terminal adapter 300, the first and second longitudinal end sides 322, 324 respectively provide a top side and a bottom side of the adapter body 310. In addition, the adapter body 310 depicted herein includes a front side or first lateral side 326, an opposed, rear side or second lateral side 328, a left side or third lateral side 330 and an opposed, right side or fourth lateral side 332. Alternative embodiments are contemplated in which the number of lateral sides may vary.

As best shown in FIG. 9, a battery terminal receiving cavity 340 is formed in the adapter body 310 and extends from the bottom side or second longitudinal side 324 into the adapter body 310. The battery terminal receiving cavity 340 is shaped and sized to house a battery terminal or electrode, not shown in the figures. The battery terminal receiving cavity 340 of the present embodiment is threaded. In other words, a battery terminal securing thread 342 is provided along a wall delimiting the battery terminal receiving cavity 340. The battery terminal securing thread 342 is configured to thread to a threaded battery terminal, as will be explained in greater detail hereinafter, allowing the battery terminal adapter 300 to thread onto the threaded battery terminal. In addition, the battery terminal receiving cavity 340 is formed as a blind hole within the adapter body 310.

In accordance with the invention, the adapter body 310 includes a plurality of wire-receiving holes 344 for the insertion therein of electrical wires. Specifically, by way of example, the adapter body 310 is illustrated as having five wire-receiving holes 344; in alternative embodiments, the number of wire-receiving holes 344 may vary. The wire-receiving holes 344 of the present embodiment are formed as through holes extending through the adapter body 310, specifically from the left side or third lateral side 330 to the opposed, right side or fourth lateral side 332. The through, wire-receiving holes 344 end in opposite openings 346, 348 arranged on the third lateral side 330 and the opposed, fourth lateral side 332, respectively. Similarly to the previous embodiment, having the openings 346, 348 arranged on oppositely-facing sides of the adapter body 310 prevents contact and possible tangling of the wires inserted through each respective opening 346, 348. However, alternative embodiments are contemplated in which any one or all of the wire-receiving holes 344 can be blind, and thus comprise a single opening on a single side of the adapter body 310. The wire-receiving holes 344 are electrically connected to the battery terminal receiving cavity 340 so that a battery terminal threaded into the battery terminal receiving cavity 340 is in electrical contact with wire conductive ends inserted into the wire-receiving holes 344 as will be explained in greater detail hereinafter.

Preferably, as shown in FIGS. 1 and 2, the battery terminal adapter 300 further includes a fastener bore 360 corresponding to each wire-receiving hole 344. Each fastener bore 360 is arranged perpendicular to its corresponding wire-receiving hole 344 and is physically communicated with the wire-receiving hole 344 forming a T-shaped cavity. The fastener bores 360 end in corresponding openings 362 arranged on the front side or first lateral side 326 of the adapter body 310, the openings allowing for the insertion of a fastener therethrough into the fastener bore 360. In some embodiments, the fastener bores 360 can include threaded walls, allowing for a threaded fastener or screw to be inserted and threaded into each fastener bore 360. The screws can contact and exert a pressure on wires in turn inserted in the corresponding wire-receiving holes 344. Such an arrangement allows securing wires inside the wire-receiving holes 344.

Figure 10:
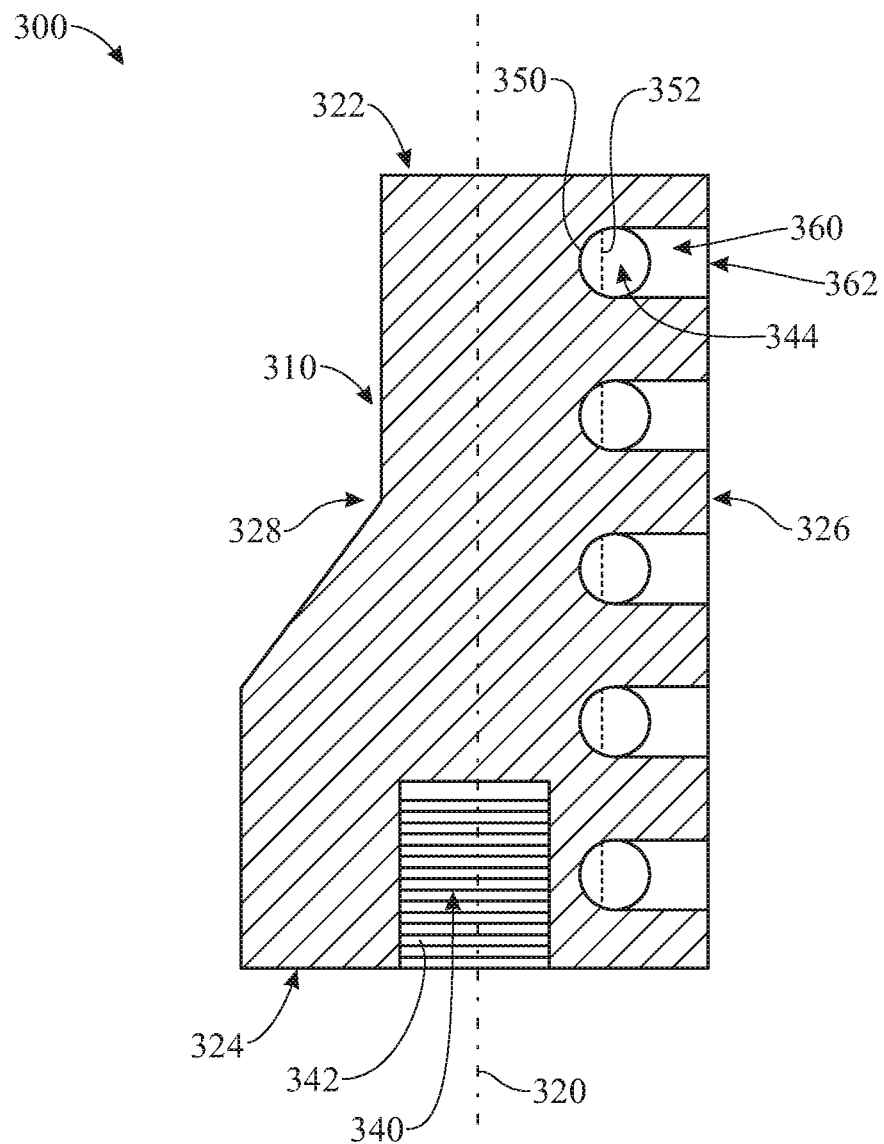
FIG. 10 presents a cross-sectional side elevation view of the battery terminal of FIG. 8, the section taken along section plane 10-10 indicated in FIG. 8.

The wire-receiving holes 344 of the present embodiment are cylindrical bores, i.e. are delimited by a respective inner cylindrical wall 350. Alternative shapes are contemplated, such as the wire-receiving holes 344 having a D-shaped cross section, i.e., the inner cylindrical wall 350 being truncated by a flat longitudinal wall 352, shown in phantom lines in FIG. 10. The flat longitudinal wall 352 can generally face the fastener bore 360 to allow for the fastener inserted in the fastener bore 360 to set flat on the one or more electrical wires that are inserted in the wire-receiving hole 344, an thus enhance gripping of the one or more wires by the fastener.

In addition, it is contemplated that all wire-receiving holes 344 have the same width, as shown herein. Alternatively, the wire-receiving bores 344 can have different widths, to accommodate wires having a different gauge. Thus, wider wire-receiving bores 344 could be used for connecting electrical cables capable of conducting higher electrical currents, for higher power consuming apparatus or systems such as a vehicle electrical system; in turn, narrower wire-receiving bores 344 could be used for connecting thinner cables for lower-power-consuming apparatus or systems, such as accessory electrical equipment installed in the vehicle (e.g., a fan).

Similarly to the previous embodiment, all wire-receiving holes 344 are electrically communicated with the battery terminal receiving cavity 340, so that electrical current can flow between the battery terminal receiving cavity 340 and each wire-receiving hole 344. Various embodiments are contemplated for providing electrical communication. For example, the battery terminal adapter 300 can be entirely metallic and electrically conductive. In another example, the battery terminal adapter 300 is only partially metallic, so that metallic parts provide a conductive connection between the battery terminal receiving cavity 340 and all wire-receiving holes 344; the rest of the battery terminal adapter 300 can be made, for instance, of plastic so that the battery terminal adapter 300 outer surface is electrically isolated and there is no risk of electric discharge for a person touching the battery terminal adapter 300 when connected to a charged battery. Applicable metallic materials include, without limitation, a creep resistant copper alloy, bronze, brass, or copper-nickel.

Figure 11:
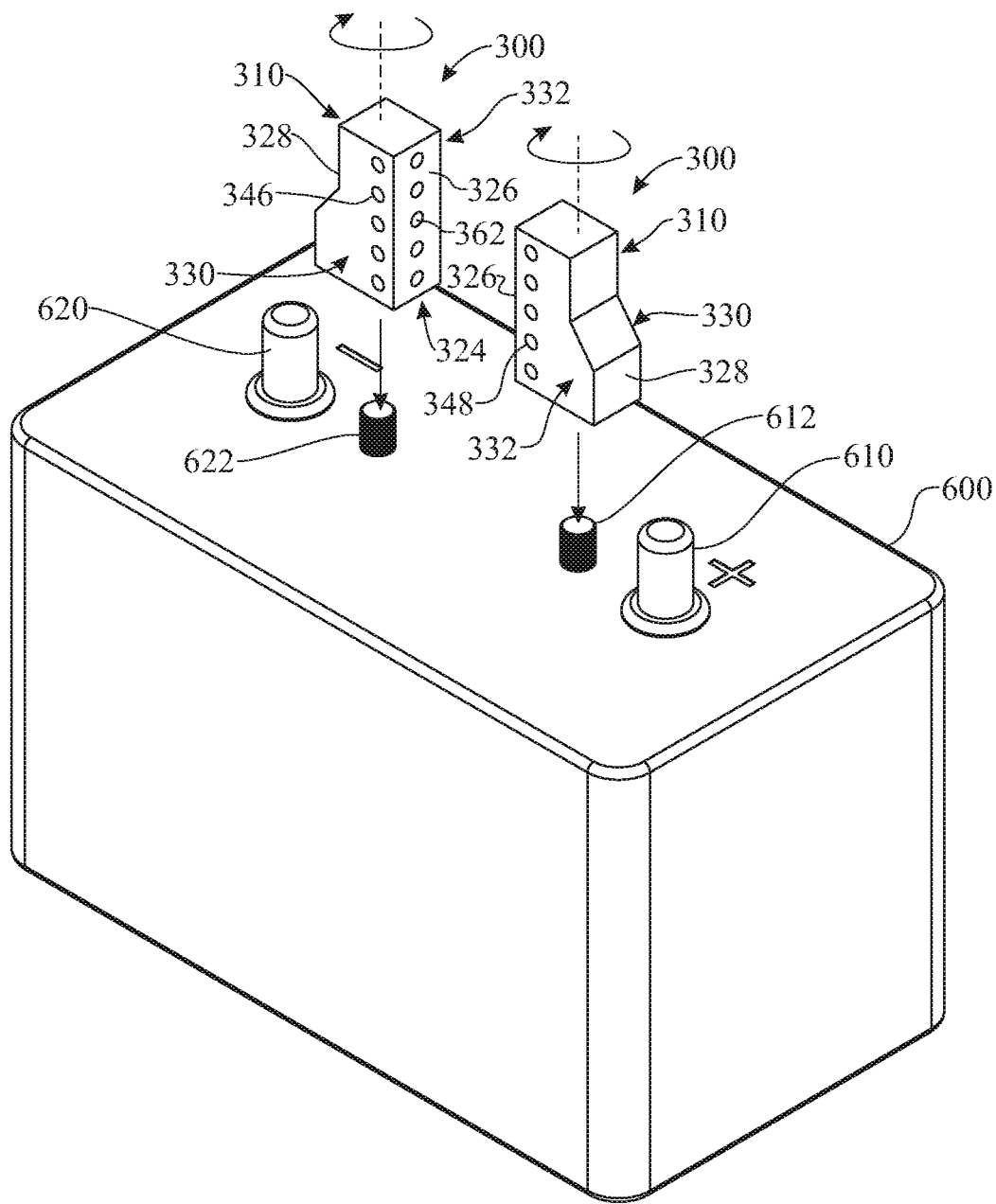
FIG. 11 presents an isometric front view of two battery terminal adapters of the type presented in FIG. 8, the battery terminal adapters shown about to be assembled onto two respective threaded battery terminals of an exemplary vehicle battery.
Figure 12:
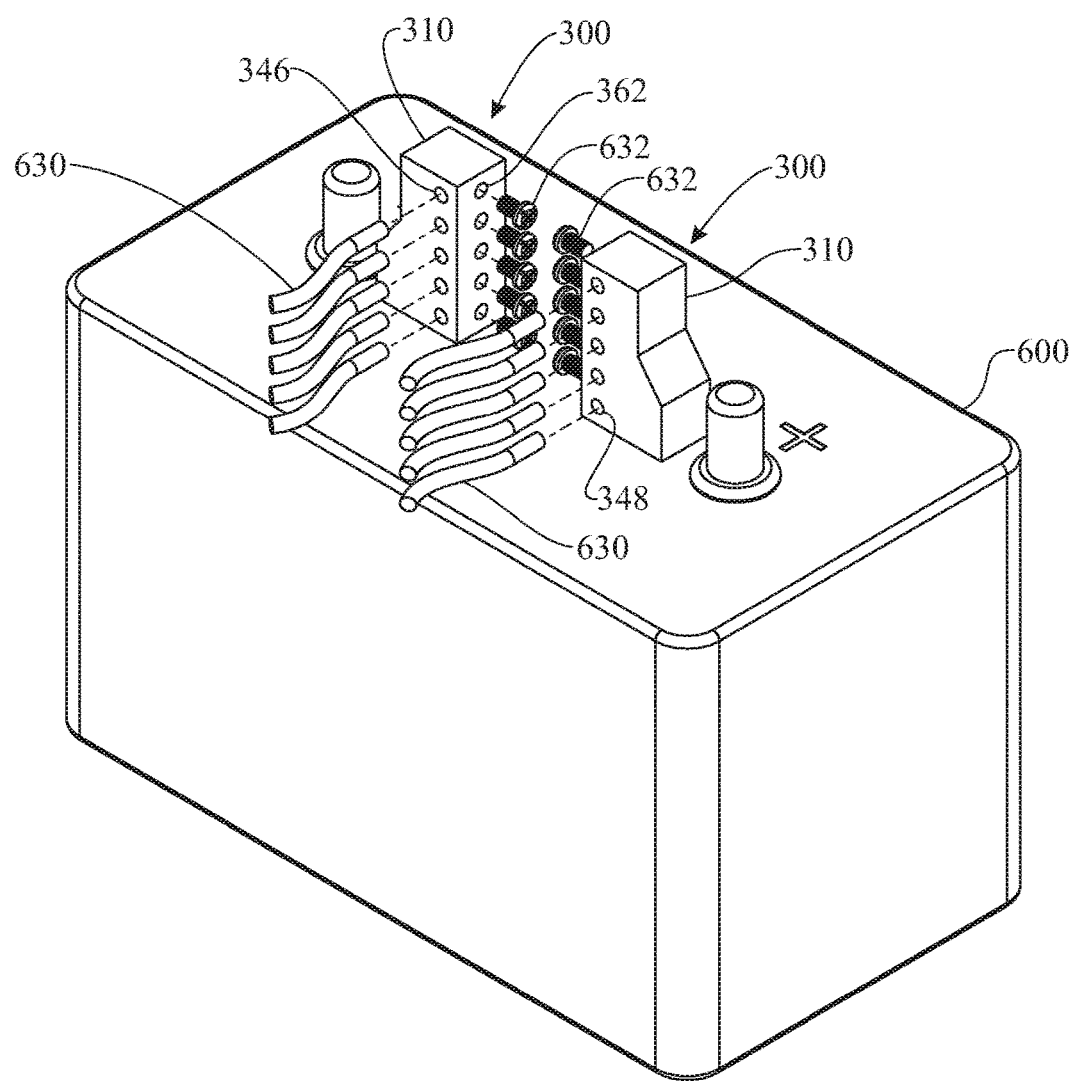
FIG. 12 presents an isometric front view of the two battery terminal adapters and the battery of FIG. 8, the battery terminal adapters shown assembled to the battery terminals and about to receive a specific set of cables.
Figure 13:
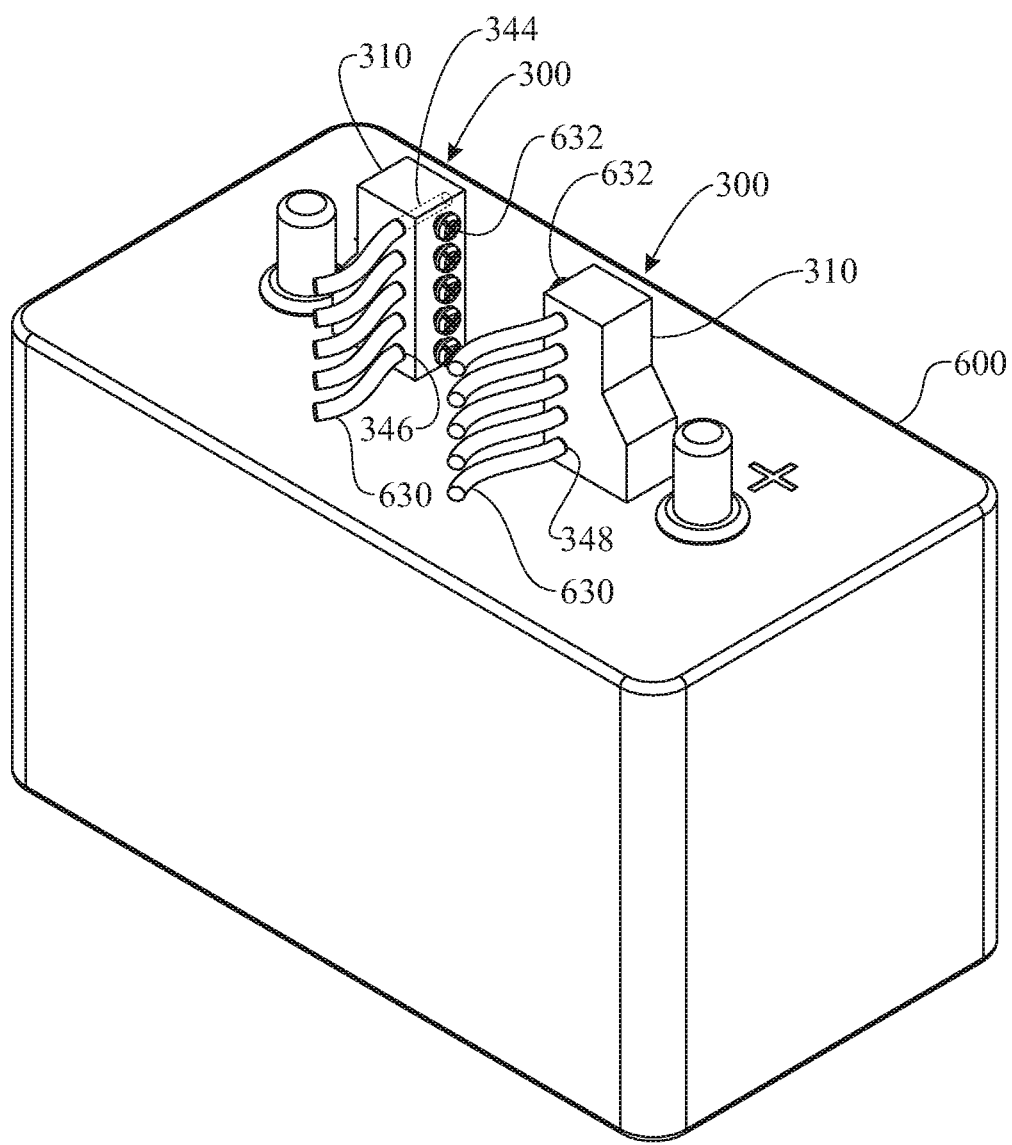
FIG. 13 presents an isometric front view of the battery terminal adapters, battery and cables of FIG. 12, shown assembled.

The illustrations of FIGS. 11 through 13 teach an exemplary sequence of steps for assembling the battery terminal adapter 300 to an exemplary vehicle battery 600. The vehicle battery 600 depicted herein includes a first positive terminal 610, a second positive terminal 612, a first negative terminal 620 and a second negative terminal 622, where the second positive and negative terminals 612, 622 are threaded. The figures show the steps to be followed for mounting one battery terminal adapter 300 to each threaded second positive and negative battery terminal 612, 622. As shown in FIG. 11, a user brings the battery terminal adapters 300 close enough to the threaded second positive and negative battery terminal 612, 622 to cause the battery terminal receiving cavity 340 of each battery terminal adapter 300 to mate with the corresponding threaded second positive and negative battery terminal 612, 622. Then, the user applies a rotational force to cause each battery terminal adapters 300 to rotate with respect to the corresponding threaded second positive and negative battery terminal 612, 622, causing the threaded second positive and negative battery terminal 612, 622 to thread into the battery terminal receiving cavities 340. Once the battery terminal adapters 300 have been secured, by threading, to the second positive and negative battery terminals 612, 622 as shown in FIG. 12, the user can proceed to connect a power cable to any one of the wire-receiving holes 344 of the battery terminal adapters 300. For instance, the illustration of FIG. 12 shows five power cables 630 being inserted through the openings 346 of the third lateral side 330 of a first battery terminal adapter 300 and five power cables 630 being inserted through the openings 348 on the fourth lateral side 332 of a second battery terminal adapter 300. The power cables 630 are secured within the corresponding wire-receiving holes 344 by fasteners 632 (e.g. screws), which are inserted through the openings 362 and threaded into the fastener bores 360 until they apply a sufficient pressure on the power cables 630 to prevent them from being pulled out of the wire-receiving holes 344. The illustration of FIG. 13 shows the power cables 630 secured to the battery terminal adapters 300 by the fasteners 632. Power from the battery 600 is now available at all power cables 630 for powering various external electrical devices. It should be noted that, while FIG. 13 shows the battery terminal adapters 300 in a final orientation in which the fastener bores 360 of one battery terminal adapter 300 are facing the fastener bores 360 of the other battery terminal adapter 300, the final orientation of the battery terminal adapters 300 may vary in alternative embodiments of the invention. In some embodiments, the final orientation of the battery terminal adapters 300 with respect to the battery 600 may be selected by the user, who may rotate the battery terminal adapters 300 to a desired final orientation. Additionally or alternatively, the battery terminal receiving cavities 340 can be configured to deliver a specific final orientation of the battery terminal adapters 300, for instance a final orientation in which the first lateral sides 326 of the battery terminal adapters 300 face away from each other.

Figure 14:
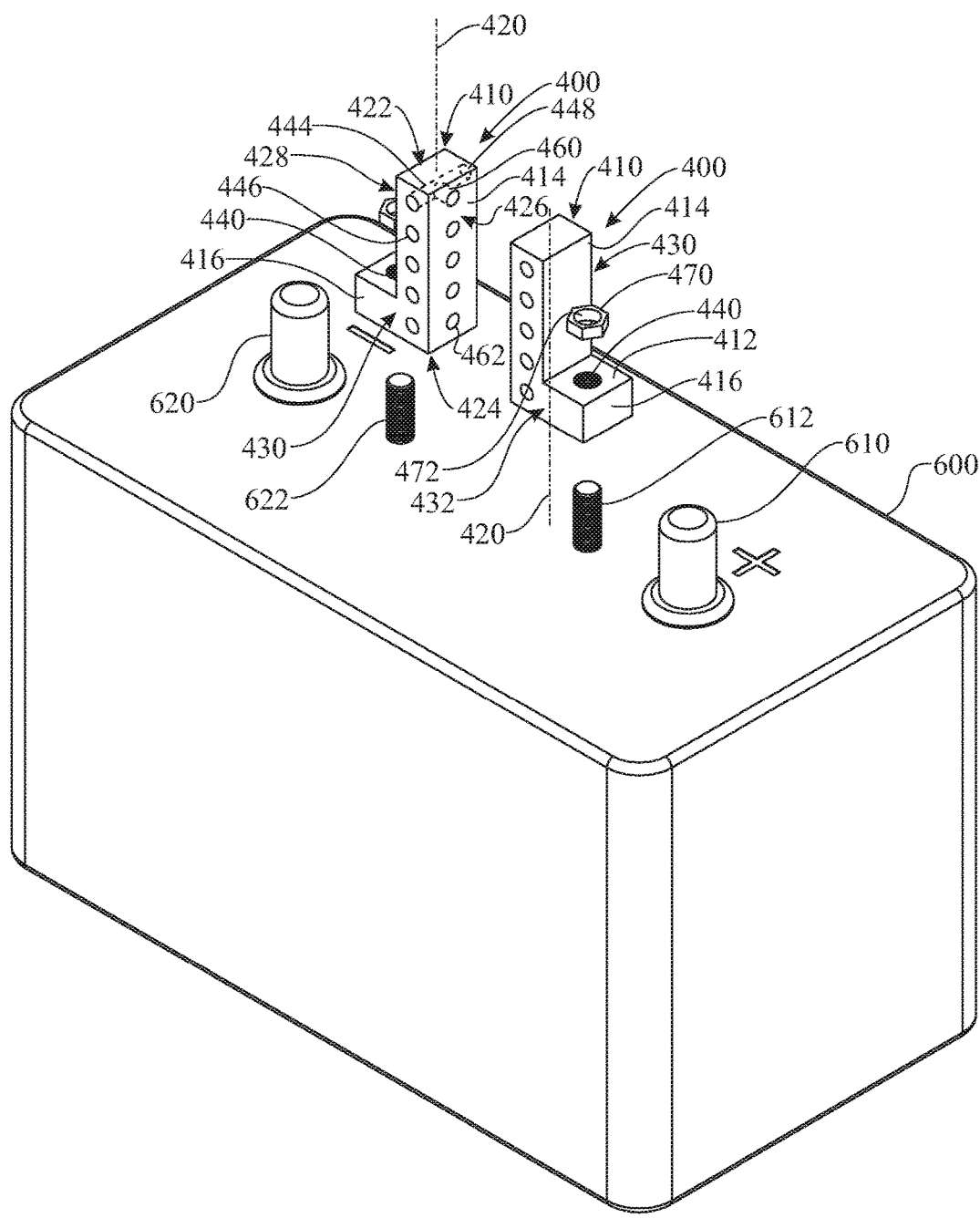
FIG. 14 presents an isometric front view of two battery terminal adapters in accordance with a third embodiment of the present invention, the battery terminal adapters shown about to be assembled onto two respective threaded battery terminals of an exemplary vehicle battery.
Figure 15:
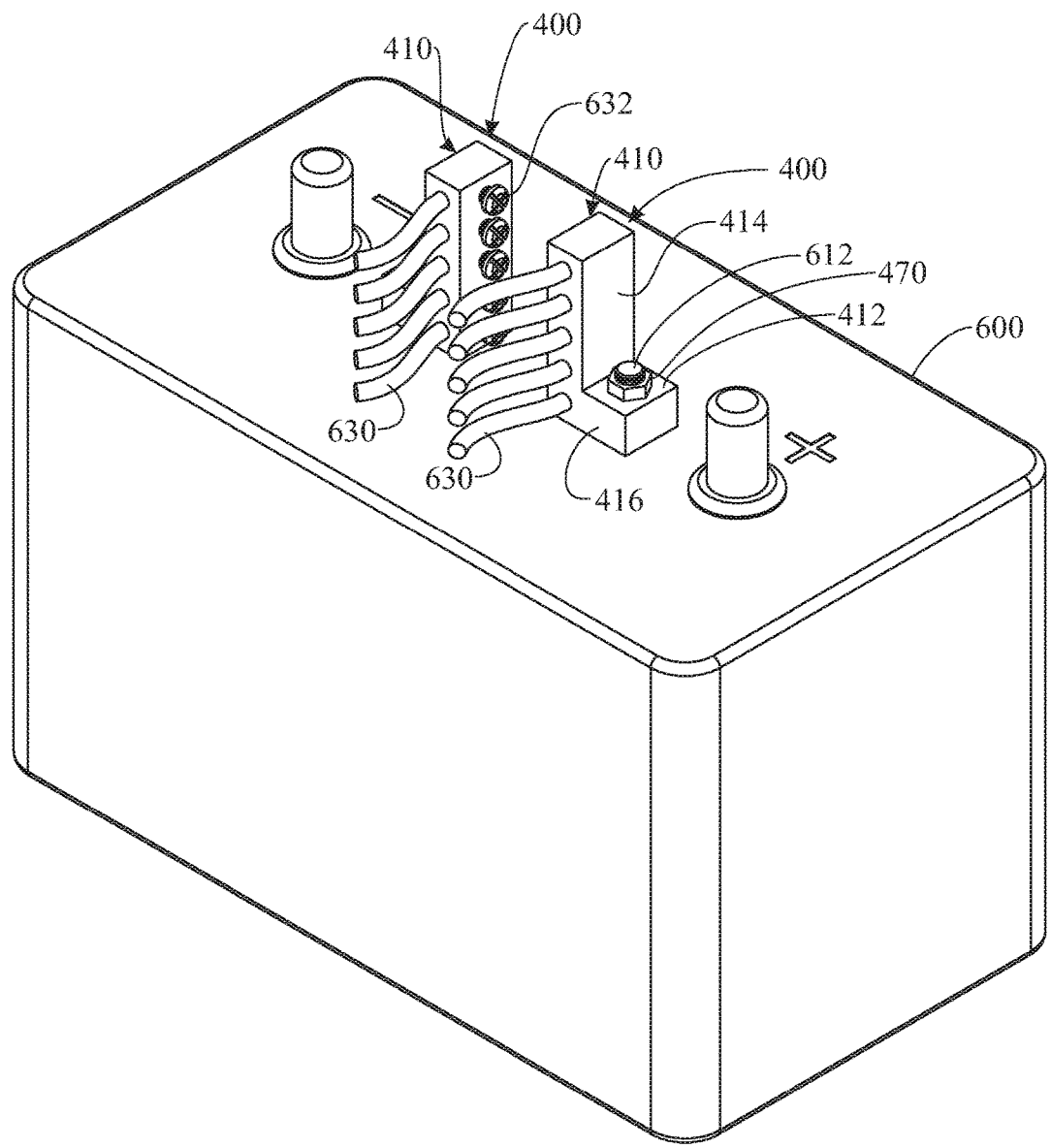
FIG. 15 presents an isometric front view of the two battery terminal adapters and the battery of FIG. 14, the battery terminal adapters shown assembled to the battery terminals.

The illustrations of FIGS. 14 and 15 present show two instances of a battery terminal adapter 400 in accordance with a second exemplary embodiment of the invention. Like features of the battery terminal adapter 400 and the battery terminal adapter 300 (FIGS. 8-13) are numbered the same except preceded by the numeral '4'. As shown, the battery terminal adapter 400 includes an adapter body 410 that is elongated in shape and arranged along a longitudinal direction 420. Similarly to the previous embodiment, the adapter body 410 comprises a bottom battery terminal receiving cavity 440 on a bottom side or second longitudinal end side 424 of the adapter body 410. The adapter body 410 further includes five wire-receiving holes 444 extending through the adapter body 410 and ending in opposite openings 446, 448 on a third lateral side 430 and opposed, fourth lateral side 432 of the adapter body 410. In turn, a fastener bore 460 extends from each wire-receiving hole 444 and ends in an opening 462 on a first lateral side 426 of the adapter body 410. Unlike the previous embodiment, the bottom battery terminal receiving cavity 440 is not threaded. Instead, the battery terminal adapter 400 further includes a nut 470 having a blind or through threaded bore, i.e., a bore provided with a battery terminal securing thread on walls delimiting the bore, the battery terminal securing thread 472 configured to thread onto the threaded second positive and negative terminals 612, 622 of the battery 600. The adapter body 410 includes a seating surface 412 for the resting of the nut 470 thereon when the nut 470 is threaded to the battery terminals, in order for the nut 470 to press on the seating surface 412 and secure the adapter body 410 to the battery 600. In some embodiments, as shown herein, the adapter body 410 can be substantially L-shaped as defined by a longitudinal segment 414 (arranged in the longitudinal direction 420) and a transverse segment 416 (transverse understood as perpendicular to the longitudinal direction 420) of the adapter body 410. The wire-receiving holes 444 and fastener bores 460 can extend along the longitudinal segment 414 of the L-shaped adapter body 410, and the battery terminal receiving cavity 440 can be arranged on the transverse segment 416 of the L-shaped adapter body 410. The seating surface 412 can be a transverse surface of the transverse segment 416, transverse understood as perpendicular to the longitudinal direction 420.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims, including any amendments made during the pendency of this application, and all equivalents of those claims as issued.

What is claimed is:

1. A battery terminal adapter for allowing a plurality of electrical wires to be connected to a same threaded battery terminal, the battery terminal adapter comprising:
   an adapter body comprising:
      two or more wire-receiving holes, wherein each wire-receiving hole extends into the adapter body from at least one opening on one or more lateral sides of the adapter body, and further wherein at least one wire-receiving hole of the two or more wire-receiving holes is a through hole extending into the adapter body from a first opening on a first lateral side of the adapter body to a second opening on an opposed, second lateral side of the adapter body;
      two or more fastener bores, wherein each fastener bore is in spatial communication with a respective one of the two or more wire-receiving holes, and further wherein each fastener bore extends into the adapter body from an opening on a lateral side of the adapter body; and
      a battery terminal receiving cavity extending into the adapter body from an opening on a longitudinal end side of the adapter body, the battery terminal receiving cavity configured to receive the threaded battery terminal, the battery terminal receiving cavity in electrically-conductive connection with the two or more wire-receiving holes; and
   a battery terminal securing thread, configured to threadingly engage with the threaded battery terminal.

2. The battery terminal adapter of claim 1, wherein the battery terminal securing thread is arranged on an internal wall of the adapter body delimiting the battery terminal receiving cavity.

3. The battery terminal adapter of claim 1, wherein the battery terminal adapter further comprises a nut having a bore, and further wherein the battery terminal securing thread is arranged on an internal wall of the nut delimiting the bore of the nut.

4. The battery terminal adapter of claim 3, wherein the adapter body is substantially L-shaped having a longitudinal segment and a transverse segment, wherein the battery terminal receiving cavity is formed in the transverse segment of the adapter body.

5. The battery terminal adapter of claim 3, wherein the bore is a blind bore.

6. The battery terminal adapter of claim 3, wherein the bore is a through bore.

7. The battery terminal adapter of claim 1, wherein the adapter body is elongated in shape along a longitudinal direction, and the two or more wire-receiving holes are arranged in a spaced-apart relationship and aligned along the longitudinal direction.

8. The battery terminal adapter of claim 1, wherein a fastener bore of the two or more fastener bores forms a T-shaped cavity with the through hole.

9. The battery terminal adapter of claim 1, wherein at least one fastener bore of the two or more fastener bores is threaded.

10. The battery terminal adapter of claim 1, wherein at least one wire-receiving hole of the two or more wire-receiving holes includes a flat wall facing a respective fastener bore.

11. The battery terminal adapter of claim 1, wherein the battery terminal adapter is formed entirely of an electrically conductive metal.

12. The battery terminal adapter of claim 1, wherein the battery terminal adapter is partially formed of a non-electrically conductive material, and further wherein the battery terminal adapter includes a conductive material connecting the two or more wire-receiving holes with the battery terminal receiving cavity.

13. A battery terminal adapter for allowing a plurality of electrical wires to be connected to a same threaded battery terminal, the battery terminal adapter comprising:
   an adapter body, elongated in shape along a longitudinal direction, the adapter body comprising:
      two or more wire-receiving holes, wherein each wire-receiving hole ends in at least one opening on a lateral side of the adapter body, and further wherein at least one wire-receiving hole of the two or more wire-receiving holes is a through hole extending into the adapter body from a first opening on a first lateral side of the adapter body to a second opening on an opposed, second lateral side of the adapter body;

two or more fastener bores, wherein each fastener bore is in spatial communication with a respective one of the two or more wire-receiving holes, and further wherein each fastener bore ends in an opening on a lateral side of the adapter body; and a battery terminal receiving cavity extending into the adapter body from an opening on a longitudinal end side of the adapter body, the battery terminal receiving cavity configured to receive the threaded battery terminal, the battery terminal receiving cavity in electrically-conductive connection with the two or more wire-receiving holes; and a battery terminal securing thread, configured to threadingly engage with the threaded battery terminal.

14. The battery terminal adapter of claim 13, wherein the battery terminal securing thread is arranged on an internal wall of the adapter body delimiting the battery terminal receiving cavity.

15. The battery terminal adapter of claim 13, wherein the battery terminal adapter further comprises a nut having a bore, and further wherein the battery terminal securing thread is arranged on an internal wall of the nut delimiting the bore of the nut.

16. A battery terminal adapter for allowing a plurality of electrical wires to be connected to a same threaded battery terminal, the battery terminal adapter comprising:

an adapter body, elongated in shape along a longitudinal direction, the adapter body comprising:

two or more wire-receiving holes, wherein each wire-receiving hole is a through hole extending into the adapter body from a first opening on a first lateral side of the adapter body to a second opening on an opposed, second lateral side of the adapter body, two or more fastener bores, wherein each fastener bore is in spatial communication with a respective one of the two or more wire-receiving holes, said each fastener bore and the respective one of the two or more wire-receiving holes thereby forming a T-shaped cavity, and further wherein each fastener bore ends in an opening on a side of the adapter body, and a battery terminal receiving cavity extending into the adapter body from an opening on a longitudinal end side of the adapter body, the battery terminal receiving cavity configured to receive the threaded battery terminal, the battery terminal receiving cavity in electrically-conductive connection with the two or more wire-receiving holes; and a battery terminal securing thread, configured to threadingly engage with the threaded battery terminal.

17. The battery terminal adapter of claim 16, wherein the battery terminal securing thread is arranged on an internal wall of the adapter body delimiting the battery terminal receiving cavity.

18. The battery terminal adapter of claim 16, wherein the battery terminal adapter further comprises a nut having a bore, and further wherein the battery terminal securing thread is arranged on an internal wall of the nut delimiting the bore of the nut.

\* \* \* \* \*